(12) United States Patent
Gianone

(10) Patent No.: US 7,489,096 B2
(45) Date of Patent: Feb. 10, 2009

(54) ROTOR POSITION DETECTION OF A BRUSHLESS DC MOTOR

(75) Inventor: László Gianone, Budapest (HU)

(73) Assignee: Knorr-Bremse Systeme fuer Nutzfahrzeuge GmbH, Munich (DE)

(*) Notice: Subject to any disclaimer, the term of this patent is extended or adjusted under 35 U.S.C. 154(b) by 124 days.

(21) Appl. No.: 11/518,951

(22) Filed: Sep. 12, 2006

(65) Prior Publication Data
US 2007/0085499 A1 Apr. 19, 2007

Related U.S. Application Data

(63) Continuation of application No. PCT/EP2005/002474, filed on Mar. 9, 2005.

(30) Foreign Application Priority Data

Mar. 12, 2004 (EP) .................................. 04005886

(51) Int. Cl.
H02P 6/00 (2006.01)

(52) U.S. Cl. .............................. 318/400.01; 318/400.42

(58) Field of Classification Search ............. 318/400.01
See application file for complete search history.

(56) References Cited

U.S. PATENT DOCUMENTS 5,280,222 A 1/1994 von der Heide et al.
6,841,969 B1 * 1/2005 Schulz et al. ............... 318/807
6,885,163 B2 4/2005 Heidrich
2001/0024100 A1 * 9/2001 Shinnaka .................... 318/701

FOREIGN PATENT DOCUMENTS

EP 0 251 785 A2 1/1988
WO WO 03/052919 A2 6/2003

OTHER PUBLICATIONS

International Search Report dated Jun. 22, 2005.

* cited by examiner

Primary Examiner—Walter Benson
Assistant Examiner—Renata McCloud
(74) Attorney, Agent, or Firm—Crowell & Moring LLP

(57) ABSTRACT

A method of determining the angular position of the rotor of a brushless direct current motor having a stator with multi-phase windings, control circuitry that provides excitations switched after one another to the motor phases such that the excitations produce stator flux vectors lying in different directions in the full 360 electrical degree range, and a measurement circuit that delivers responses for the phase excitations is provided. The position is estimated by selecting the main excitation stator flux vector which results in the minimal inductivity shown by the measured response, and selecting the two other vectors in the previous and subsequent directions with respect to the direction of the main vector, and by computing the ratio between differences of measured responses for the selected stator flux vectors.

11 Claims, 2 Drawing Sheets

ROTOR POSITION DETECTION OF A BRUSHLESS DC MOTOR

CROSS-REFERENCE TO RELATED APPLICATIONS

This application is a continuation of PCT International Application No. PCT/EP2005/002474, filed on Mar. 9, 2005, which claims priority under 35 U.S.C. §119 to European Application No. 04005886.9, filed Mar. 12, 2004, the entire disclosures of which are expressly incorporated by reference herein.

BACKGROUND AND SUMMARY OF THE INVENTION

The invention relates to a method for determining rotor position for a brushless direct current (so-called BLDC) motor without using a position sensor. The determined position information can be applied to controlling the motor.

The control of BLDC motors includes an electronic commutator, which determines the necessary excitations of the windings of the different phases according to the actual position of the rotor. The classical way to determine rotor position is to use position sensors that trigger the switch from one commutation state to another. Using such position sensor mechanisms increases the price especially if the motor is located separately from the controlling electronics in the given application.

Rotor position determination without using special position sensor mechanism is based on the fact that a position can be obtained basically from the electromagnetic characteristics of the machine itself.

Maybe the most widely spread method is the back-EMF method, where the rotor position is determined on the basis of the induced voltage functions by rotation (Lenz's law). The disadvantage of this method is that the amplitude of the induced voltage is practically too low for determining the position at low rotational speed. So, this method cannot be used to start the motor.

During standstill and at low speed, typically, extra excitation is inserted to get information about the rotor position. One classification of these methods can be done along the property if they include excitation of only one phase or several phases of the motor for calculating the position estimate. The methods that excite several or all phases of the motor have the advantage that no initial information is necessary about the flux and/or inductivity characteristics of the motor.

The general pre-assumption is only that inductivity of the stator windings varies in the function of the position, and that its periodicity is 360° el (and it is not 180° el). Sufficient condition for this is if the inductivity of the windings of the phases enters into the nonlinear (saturation) region of the characteristics at least in a part of the position range.

European patent specification EP-0251785 proposes a method to determine commutation on the basis of the highest measured value among the responses for the excitation pulses. The excitation pulses are provided for each phase in both polarities and have the same fixed time period. Here, the estimated position data is selected out of a discrete set having a resulting of 180° el/p, where p denotes the number of stator phases.

European patent specification EP-0536113 bases its method also on 2p number of measurement data. Here, continuous position estimation is provided by calculating the phase of the first harmonic out of the inverse discrete Fourier transform of the response values. The calculated position information is used to determine starting commutation command. After this starting commutation command, it is proposed to control the change of the commutation with an experimentally predetermined series of commutation time periods until a limit speed is reached. After reaching the limit speed, the back-EMF method is applied for commutation control.

The basic idea described in WO-2003052919 is similar to that of EP-0251785. But here the maximal amplitude of the responses for all test pulses is fixed to the same value, and the necessary time periods to reach the limit are measured. Then, commutation is selected according to the phase excitation with the smallest time period. After initial measurement, it is further proposed here to reduce the number of measurement pulses to three if the direction of rotation is not known, and to two if the direction is known.

There is therefore needed a method to determine the rotor position through simple calculation using reduced number of excitations, but still resulting in a continuous estimate, that is, more advantageous than the above methods.

This need is met by a method of determining the angular position of the rotor of a brushless direct current motor having a stator with multi-phase windings, a control circuitry that provides excitations switched after one another to the motor phases such that excitations produce stator flux vectors lying in different directions in the full 360 electrical degree range, and a measurement circuitry that delivers responses for the phase excitations. The position is estimated by selecting the main excitation stator flux vector, which results in the minimal inductivity shown by the measured response, and selecting the two other vectors in the previous and subsequent directions with respect to the direction of the main vector, and by computing the ratio between differences of measured responses for the selected stator flux vectors.

As such, the method of the invention determines the maximum of the nonlinear curve of the counterinductivity characteristics out of the small number of measured data. The displacement of the maximum of the curve is equivalent to the angular displacement of the rotor from the position, where rotor magnetic polarity is aligned with the direction of the 1st stator flux vector.

Accordingly, the rotor position is determined by simple calculation using reduced number of excitations resulting in a continuous estimate.

According to a further aspect of the invention, the motor works in the non-linear (saturation) region of the inductivity characteristics at least in a part of the position range.

According to a further aspect of the invention, the measured responses of the stator phases are proportional to the actual inductivity or counterinductivity of the motor windings. A measured response will be, for example, proportional to the inductivity if the time period of the response signal transient is measured until reaches a fixed maximum level. On the other hand, a measured response will be, for example, proportional to the actual counterinductivity if the maximum of the current response transient is measured for an excitation pulse having a fixed time period.

According to a further aspect of the invention, the motor phases are excited with at least 3 stator flux vectors selected from the 2p stator flux vectors lying at electrical angles of k=0, . . . , 2p−1, where p denotes the number of phases of the motor. Selection of the excitation directions is made in such a way that at least the main vector and the vectors lying in the previous and subsequent directions are chosen for excitation.

According to a further aspect of the invention, the position dependent motor values are inverted before being applied in the further calculation, if they are proportional to the inductivity of the windings. Thus, a data set with values proportional to counterinductivity of the windings is always used in the position estimation. The measured or calculated position dependent motor values that are proportional to the counterinductivity are denoted by $\{i_0, \ldots, i_{2p-1}\}$ According to a further aspect of the invention, the selection of the main excitation stator flux vector is done by selecting the vector that corresponds to the maximal value among $\{i_0, \ldots, i_{2p-1}\}$. If more than one equivalent maximal values are found, then any of their indices can be chosen for the index of the main excitation stator flux vector. Then, the ratio between differences of measured responses for the selected stator flux vectors is computed as a fraction, the numerator of which is $i_n$ minus $i_\lambda$, and the denominator of which is $i_m$ minus $i_n$, if $i_\lambda$ is greater than $i_n$, else if $i_m$ does not equal $i_\lambda$, then the denominator is $i_m$ minus $i_\lambda$, else the denominator is 1, where m denotes the index of the direction of the main excitation, and $\lambda$, n denote the indices of the directions before and, respectively, after the direction of the main excitation. Finally, the estimated position is obtained as m times $\pi$ over $2p$.

Other objects, advantages and novel features of the present invention will become apparent from the following detailed description of the invention when considered in conjunction with the accompanying drawings.

DETAILED DESCRIPTION OF THE DRAWINGS

Figure 1:
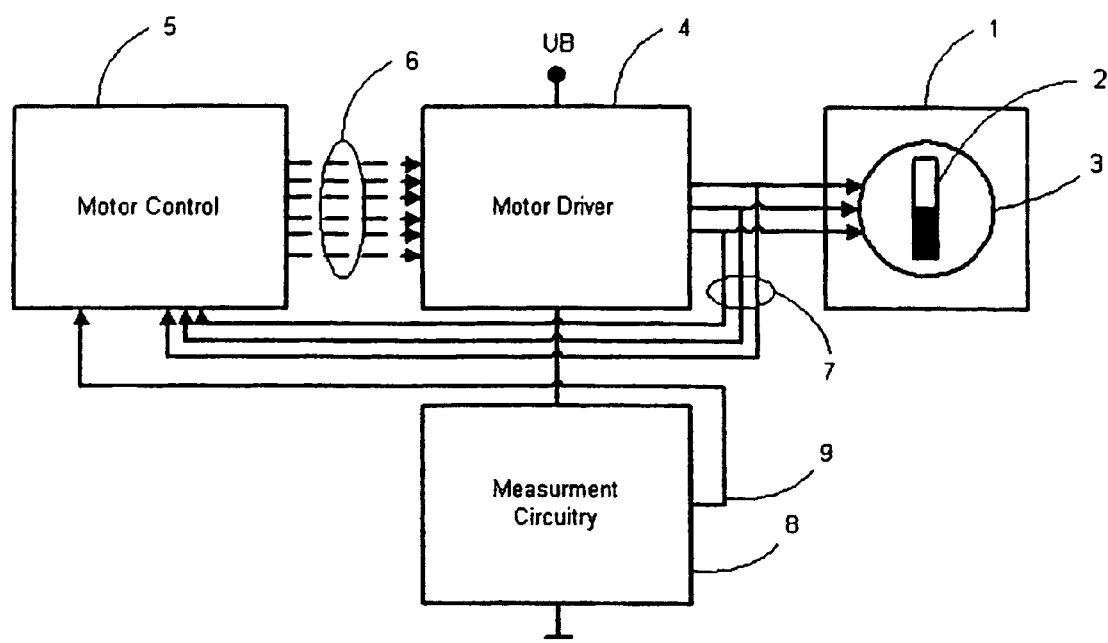
FIG. 1 is a block diagram illustrating a method of controlling a BLDC motor.

Referring to FIG. 1, the motor 1 consists of a rotor 2 and a multi-phase stator 3. The rotor 2 may, e.g., be of a salient pole type with permanent magnet or excited with DC, or it may, e.g., also be of an exterior type with surface permanent magnet. The motor 1 is driven with a driver circuit 4, which is controlled with a control device 5.

The motor 1 is controlled in such a way that subsequent commands to the driver circuit 4 on the command lines 6 switch current from the external power supply UB to those stator phases that build a magnetic field for providing the maximal moment for rotating the rotor 2. Therefore, excitation of the phases must be changed synchronously with the rotation of the rotor 2 (by switching among the commutation commands), and its timing needs position information of the rotor 2.

If rotor 2 already rotates above a certain speed, information for timing of the switching of the commutation commands can be obtained from the measurements of the phase voltages 7 (Back-EMF method).

If the speed of the rotor 2 is below the level where the induced voltages can be used to time the commutation change, commutation control is suspended for a certain period of time, during which rotor position is determined out of the responses for forced excitations of the phases. The responses are measured with measurement circuitry 8 and fed back with a feedback signal 9 to the motor control device 5. Motor control device 5 calculates the position estimate out of a series of feedback values and determines the proper control command accordingly, which is sent to the motor driver circuit 4. This procedure is repeated with some frequency starting from standstill until motor 1 reaches the speed where the back-EMF method can already be used.

Figure 2:
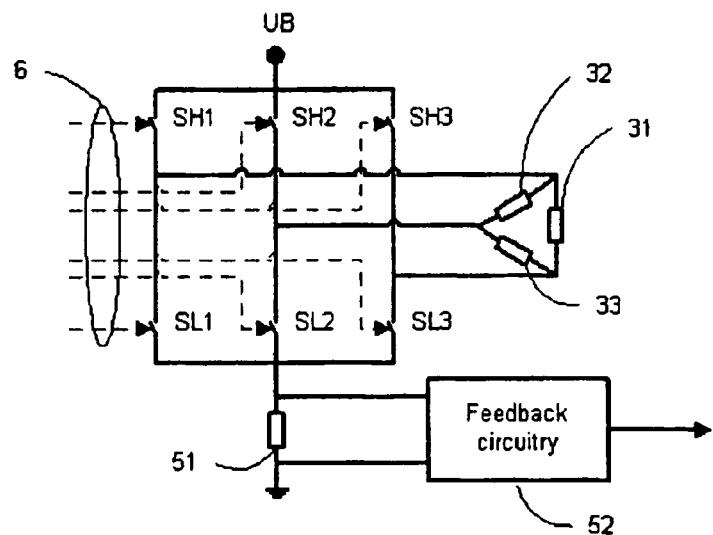
FIG. 2 is a schematic diagram of the commutation driver and measurement circuit.

The driver circuit 4 is depicted in more detail in FIG. 2. FIG. 2 shows the example of a so-called half-bridge circuit for a 3-phase motor having stator windings connected in delta 31, 32, 33, but the invention is equivalently applicable for motors with a star-connection, and for motors having other than three phases with different driver circuits. In the case where a half bridge type motor driver is used, motor control device 5 switches on one of the high-side switches (SH1, SH2, SH3), and one of the low-side switches (SL1, SL2, SL3) of driver circuit 4 to energize the actually needed motor phases. Simultaneous switching of SHi and SLk is forbidden with i=k. The allowed other combinations result in six possible stator flux vectors displaced with equivalent angle distances of 60° electric after one another. A commutation command selects always the proper stator flux vector for excitation to provide maximal moment for rotating the rotor 2.

Position measurement is necessary to start the rotor 2 from standstill without pulling it into an initial position, and frequently during commutation at low speed. In the latter case, normal commutation control does not work, thus a time period is waited until windings are de-energized, and a measurement procedure is inserted.

To be general in the formulation of determining the position, the number of phases of the motor 1 is denoted by p. Motor values proportional to the actual inductivity or counterinductivity of the stator windings are measured by applying excitations in different directions in order to determine the rotor position. In the preferred embodiment, the motor phases are excited with the motor driver 2 applying short pulses in electrical angles of $k\pi/p$, $k=0, \ldots, 2p-1$. As will be seen later, excitations in only three to four directions are sufficient after position is once initially determined.

In case of an excitation pulse in any of the selected directions, the current flows through a shunt-resistance 51. In the preferred embodiment, two solutions are proposed to provide the feedback signal for the motor control device 5 to calculate the position estimate. Either the built voltage transient of this resistance can be amplified and then fed back after to the motor control device 5. Thus, the feedback signal is proportional to the actual counterinductivity of the excited windings. Motor control device 5 samples the feedback signal after a constant delay from the beginning but before the end of the excitation pulse. Then, feedback circuit 52 consists of an amplifier and possible filtering. Another solution is when the amplified voltage is compared with a pre-selected fixed reference voltage, and the output of the comparator is fed back to the motor control device 5. Then, the excitation pulse is kept until output of the comparator changes, and the measured resulting period of the pulse is proportional to the inductivity. Then, feedback circuit 52 consists of a possible amplifier and filtering, the comparator, and the reference voltage source or input. In any of these or other possible cases for measuring inductivity or counterinductivity, the measured value is finally transformed to be proportional to counterinductivity within the motor control device 5.

This way of measurement is repeated in such selected direction of the stator flux vectors resulting in a data set with values $\{i_k, k=0, \ldots, 2p-1\}$ proportional to the counterinductivity. (Reducing the number of measurements will be discussed later.) The measured values are stored after each measurement, and the position estimation algorithm is started after the measurement sequence is finished.

Figure 3:
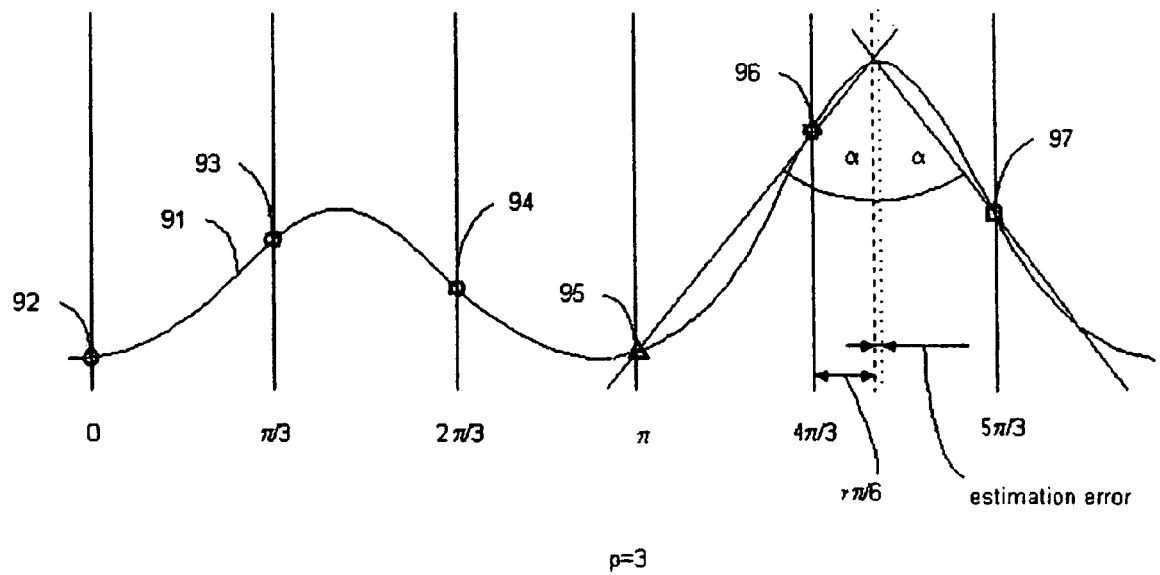
FIG. 3 is a graph of one period of the inductivity of a phase in the position of the function showing the method of position estimation according to the invention.

The preferred algorithm for determining the rotor position out of the set of data $\{i_k, k=0, \ldots, 2p-1\}$ proportional to the counterinductivity can be derived using geometrical operations depicted in FIG. 3. The nonlinear curve 91 represents an exemplary function proportional to the counterinductivity characteristic in the function of the rotor position with a selected stator flux vector. The maximum of the curve 91 shows the angular displacement of the rotor 2 from the position, where rotor magnetic polarity is aligned with the direction of the 1st stator flux vector (direction of 0). During the measurement process, discrete points (92, 93, . . . , 97) of this curve are measured (assuming symmetrically in the characteristic of the different phases).

The algorithm for determining the rotor angular position may be formulated as follows:

A. Search for the maximal value among the data set. Denote its index with m (Note that indices go from 0 to 2p−1).

B. Calculate the following ratio among the data of the set: where λ={m−1 if m>0, 2p−1 if m=0, and n={m+1 if m<2p−1, 0 if m=2p−1

C. Position is estimated as θ=(m+r/2)π/p.

It can be seen that after Step A (selection of the maximal value) response values of excitations in only three directions are used to calculate the position information. If a previous position estimate is given, then the measurement values in the same three directions can be used to calculate the new estimate until the middle one is the largest among them. If the one with an electrical angle of π/p earlier than the previous maximum becomes the new largest value, then an additional excitation 2π/p earlier than the previous maximum should be applied to receive the new necessary value for calculating the actual position. Similarly, if one with an electrical angle of π/p later than the previous maximum becomes the new largest value, then an additional excitation 2π/p later than the previous maximum should be applied to receive the new necessary value for calculating the actual position. That is, only three to four excitation pulses are sufficient after the position is once initially determined, resulting in a reduction of the total time period for the measurement process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of determining an angular position of a rotor of a brushless direct current motor having a stator with multi-phase windings, control circuitry providing excitations switched one after another to motor phases such that the excitations produce stator flux vectors lying in different directions in a full 360 electrical degree range, and a measurement circuit that delivers responses for the phase excitations, the method comprising the acts of:

selecting a main excitation stator flux vector resulting in a minimal inductivity shown by a measured response;

selecting two other stator flux vectors, one of which is in a previous and another of which is in a subsequent direction with respect to a direction of the main excitation stator flux vector; and computing a ratio between differences of measured responses for the selected stator flux vectors in order to estimate an angular position of the rotor of the brushless direct current motor, wherein the selection of the main excitation stator flux vector is done by selecting a vector that corresponds to a maximal value among $\{i_0, \ldots i_{2p-1}\}$, where if more than one equivalent maximal value is found, then any of their indices are selectable for the index of the main excitation stator flux vector; the ratio between differences of measured responses for the selected stator flux vectors being computed as a fraction, the numerator of which is $i_n$ minus $i_\lambda$, and the denominator of which is $i_m$ minus $i_n$, if $i_\lambda$ is greater than $i_n$, else if $i_m$ does not equal $i_\lambda$, then the denominator is $i_m$ minus $i_\lambda$, else the denominator is 1, where m denotes the index of the direction of the main excitation, and λ, n denote indices of the directions before and, respectively, after the direction of the main excitation; and wherein the estimated position is obtained as m times π over p plus the calculated ratio between differences of measured responses for the selected stator flux vectors times π over 2p.

2. The method according to claim 1, wherein the motor works in a non-linear (saturation) region of inductivity characteristics at least in a part of a position range.

3. The method according to claim 1, wherein the measured responses are proportional to an actual inductivity or counterinductivity of the multi-phase windings of the motor.

4. The method according to claim 3, wherein a measured response proportional to the inductivity is the time period of an excitation pulse to a stator phase until the response signal transient reaches a fixed maximum level.

5. The method according to claim 3, wherein a measured response proportional to the counterinductivity is the maximum of the current response transient of a stator phase for an excitation pulse of a fixed time period.

6. The method according to claim 3, wherein position dependent motor values are inverted before being applied in a further calculation, if they are proportional to the inductivity of the windings; the measured or calculated position dependent motor values that are proportional to the counterinductivity of the windings being denoted by $\{i_0, \ldots, i_{2p-1}\}$.

7. The method according to claim 1, wherein a measured response proportional to the inductivity is the time period of an excitation pulse to a stator phase until the response signal transient reaches a fixed maximum level.

8. The method according to claim 1, wherein a measured response proportional to the counterinductivity is the maximum of the current response transient of a stator phase for an excitation pulse of a fixed time period.

9. A method of determining an angular position of a rotor of a brushless direct current motor having a stator with multi-phase windings, control circuitry providing excitations switched one after another to motor phases such that the excitations produce stator flux vectors lying in different directions in a full 360 electrical degree range, and a measurement circuit that delivers responses for the phase excitations, the method comprising the acts of:

selecting a main excitation stator flux vector resulting in a minimal inductivity shown by a measured response;

selecting two other stator flux vectors, one of which is in a previous and another of which is in a subsequent direction with respect to a direction of the main excitation stator flux vector; and computing a ratio between differences of measured responses for the selected stator flux vectors in order to estimate an angular position of the rotor of the brushless direct current motor, wherein the motor phases are excited with at least 3 stator flux vectors selected from the 2p stator flux vectors lying at electrical angles of kπ/p, k =0, . . ., 2p −1, where p denotes a number of phases of the motor, where selection is made such that at least the main vector and the vectors lying in the previous and subsequent directions are chosen for excitation, wherein the selection of the main excitation stator flux vector is done by selecting a vector that corresponds to a maximal value among $\{i_0,\ldots,i_{2p-1}\}$, where if more than one equivalent maximal value is found, then any of their indices are selectable for the index of the main excitation stator flux vector; the ratio between differences of measured responses for the selected stator flux vectors being computed as a fraction, the numerator of which is $i_n$ minus $i_\lambda$, and the denominator of which is $i_m$ minus $i_n$, if $i_\lambda$ is greater than $i_n$, else if $i_m$ does not equal $i_\lambda$, then the denominator is $i_m$ minus $i_\lambda$, else the denominator is 1, where m denotes the index of the direction of the main excitation, and $\lambda$, n denote indices of the directions before and, respectively, after the direction of the main excitation; and wherein the estimated position is obtained as m times $\pi$ over p plus the calculated ratio between differences of measured responses for the selected stator flux vectors times $\pi$ over 2p.

10. The method according to claim 9, wherein position dependent motor values are inverted before being applied in a further calculation, if they are proportional to the inductivity of the windings; the measured or calculated position dependent motor values that are proportional to the counterinductivity of the windings being denoted by $\{i_0,\ldots,i_{2p-1}\}$.

11. A method of determining an angular position of a rotor of a brushless direct current motor having a stator with multiphase windings, control circuitry providing excitations switched one after another to motor phases such that the excitations produce stator flux vectors lying in different directions in a full 360 electrical degree range, and a measurement circuit that delivers responses for the phase excitations, the method comprising the acts of:

selecting a main excitation stator flux vector resulting in a minimal inductivity shown by a measured response;

selecting two other stator flux vectors, one of which is in a previous and another of which is in a subseauent direction with respect to a direction of the main excitation stator flux vector; and computing a ratio between differences of measured responses for the selected stator flux vectors in order to estimate an angular position of the rotor of the brushless direct current motor, wherein position dependent motor values are inverted before being applied in a further calculation, if they are proportional to the inductivity of the windings; the measured or calculated position dependent motor values that are proportional to the counterinductivity of the windings being denoted by $\{i_0,\ldots,i_{2p-1}\}$, wherein the selection of the main excitation stator flux vector is done by selecting a vector that corresponds to a maximal value among $\{i_0,\ldots i_{2p-1}\}$, where if more than one equivalent maximal value is found, then any of their indices are selectable for the index of the main excitation stator flux vector; the ratio between differences of measured responses for the selected stator flux vectors being computed as a fraction, the numerator of which is $i_n$ minus $i_\lambda$, and the denominator of which is tm minus $i_n$, if $i_\lambda$ is greater than $i_n$, else if $i_m$ does not equal $i_\lambda$, then the denominator is $i_m$ minus $i_\lambda$, else the denominator is 1, where m denotes the index of the direction of the main excitation, and $\lambda$, n denote indices of the directions before and, respectively, after the direction of the main excitation; and wherein the estimated position is obtained as m times $\pi$ over p plus the calculated ratio between differences of measured responses for the selected stator flux vectors times $\pi$ over 2p.

* * * * *